United States Patent
Takase

(10) Patent No.: US 9,388,964 B2
(45) Date of Patent: Jul. 12, 2016

(54) ILLUMINATION DEVICE AND DISPLAY DEVICE EQUIPPED WITH SAME

(71) Applicant: SHARP KABUSHIKI KAISHA, Osaka-shi, Osaka (JP)

(72) Inventor: Motoki Takase, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 45 days.

(21) Appl. No.: 14/373,703

(22) PCT Filed: Dec. 4, 2012

(86) PCT No.: PCT/JP2012/081353
§ 371 (c)(1),
(2) Date: Jul. 22, 2014

(87) PCT Pub. No.: WO2013/125125
PCT Pub. Date: Aug. 29, 2013

(65) Prior Publication Data
US 2015/0009681 A1    Jan. 8, 2015

(30) Foreign Application Priority Data

Feb. 23, 2012  (JP) ................. 2012-037703

(51) Int. Cl.
*F21V 13/04*    (2006.01)
*G02F 1/1335*    (2006.01)

(52) U.S. Cl.
CPC .......... *F21V 13/04* (2013.01); *G02F 1/133603* (2013.01); *G02F 2001/133607* (2013.01)

(58) Field of Classification Search
CPC ........... F21V 13/04; F21V 5/00; F21V 17/00; F21V 17/005; G02F 1/133603; G02F 2001/133607; G02F 1/133602; G02F 1/133606

See application file for complete search history.

(56) References Cited

U.S. PATENT DOCUMENTS

| 7,766,530 | B2 * | 8/2010 | Hwang | G02B 3/005 362/240 |
| 8,622,594 | B2 * | 1/2014 | Ishio | G02F 1/133606 257/98 |
| 8,690,371 | B2 * | 4/2014 | Takeuchi | H05K 1/142 362/97.1 |
| 9,081,227 | B2 * | 7/2015 | Matsui | G02F 1/133605 |
| 2012/0063150 | A1 * | 3/2012 | Takeuchi | G09F 9/33 362/308 |
| 2012/0105739 | A1 * | 5/2012 | Shimizu | F21V 5/04 348/790 |

FOREIGN PATENT DOCUMENTS

| JP | 2011-3535 A | 1/2011 |
| JP | 2011-86569 A | 4/2011 |

* cited by examiner

*Primary Examiner* — Bao Q Truong
(74) *Attorney, Agent, or Firm* — Birch, Stewart, Kolasch & Birch, LLP

(57) ABSTRACT

Provided is an illumination device capable of preventing a reflection sheet in the periphery of a light-emitting element from being raised while minimizing the instability in the fixture of a diffusion lens. The illumination device comprises a light-emitting element, a mounting substrate, a diffusion lens, and a reflection sheet having a through-hole. The diffusing lens includes a lens portion for diffusing light, and a fixed portion to be fixed to the mounting substrate. An engaging portion that sandwiches the reflection sheet between the engaging portion and the mounting substrate is formed in the fixed portion.

14 Claims, 3 Drawing Sheets

ILLUMINATION DEVICE AND DISPLAY DEVICE EQUIPPED WITH SAME

TECHNICAL FIELD

The present invention relates to an illumination device and a display device that comprises the same, more particularly, to an illumination device that includes a reflecting sheet and to a display device that comprises the same.

BACKGROUND ART

In a liquid crystal display device (display device), a display panel is of non-light emitting type; accordingly, usually, a backlight device (illumination device), which shines light onto the display panel, is incorporated. As such a backlight device, a backlight device of direct type is known, which comprises a plurality of LEDs (light emitting element) and a reflecting sheet that reflects light emitted from the LED to a display panel.

FIG. 7 is a cross-sectional view showing schematically a structural example of a conventional display device that comprises a backlight device of direct type that includes a plurality of LEDs and a reflecting sheet. FIG. 8 and FIG. 9 are each a cross-sectional view showing a structure around the LED of the conventional display device shown in FIG. 7. As shown in FIG. 7, a display device 1001 comprises a liquid crystal display panel 1002 and a backlight device 1010 that shines light onto the liquid crystal display panel 1002. The backlight device 1010 includes: a plurality of LEDs 1011; a mounting, board 1012 on which the plurality of LEDs 1011 are mounted; a plurality of diffusing lenses 1013 that diffuse light emitted from the LEDs 1011; a reflecting sheet 1014 that reflects light emitted from the LEDs 1011 to the liquid crystal display panel 1002 side; a diffusing plate 1015 and a plurality of optical sheets 1016 that are disposed in front (the liquid crystal display panel 1002 side) of the diffusing lens 1013; and a chassis 1017 that houses the LEDs 1011, the mounting board 1012 and the like.

As shown in FIG. 8, the diffusing lens 1013 is fixed to the mounting board 1012 to cover the LED 1011. The reflecting sheet 1014 is provided with a through-hole 1014a through which the diffusing lens 1013 is disposed, and disposed on the mounting board 1012. Besides, the reflecting sheet 1014 is fixed to the mounting board 1012 by means of a rivet 1020 or a not-shown adhesive layer (double-coated tape or the like).

In the case of using the rivet 1020, the rivet 1020 is often disposed at a position far from the LED 1011 not to block the illumination light. Because of this, as shown in FIG. 9, there is a case where the reflecting sheet 1014 is raised around the mounting board 1012. In this case, there is a disadvantage that part of the light emitted from the LED 1011 goes under the reflecting sheet 1014; whereby brightness unevenness easily occurs and light loss occurs.

To improve the above disadvantage, illumination devices are proposed, which alleviate the rising of a reflecting sheet by means of a diffusing lens (e.g., patent documents 1 and 2).

The patent document 1 discloses a light source device (illumination device) that has: a plurality of light emitting diodes (light emitting elements); a light emitting diode board (mounting board) on which the plurality of light emitting diodes are mounted; a diffusing lens that diffuses the light emitted from the light emitting diode; and a reflecting sheet that is provided with a through-hole, through which the diffusing lens is disposed, and disposed on the light emitting diode board.

The diffusing lens includes a lens portion that diffuses the light emitted from the light emitting diode and a positioning protrusion (fixing portion) that protrudes from the lens portion to the light emitting diode board to be fixed to the light emitting diode board. The lens portion is provided with a convex portion that protrudes in parallel with a surface of the light emitting diode board. The convex portion cooperates with the light emitting diode board to sandwich the reflecting sheet, thereby alleviating the rising of the reflecting sheet.

The light source device in the patent document 1 alleviates the rising of the reflecting sheet by means of the diffusing lens; accordingly, it is possible to somewhat alleviate the reflecting sheet being raised from the light emitting diode board around the light emitting diode. Because of this, it is possible to somewhat alleviate the light emitted from the light emitting diode going under the reflecting sheet, and it is possible to somewhat alleviate the brightness unevenness and light loss.

The patent document 2 discloses a light emitting device (illumination device) that comprises: a plurality of light emitting elements; a board (mounting board) on which the plurality of light emitting elements are mounted; a luminous flux control member (diffusing lens) that diffuses the light emitted from the light emitting element; and a reflecting sheet disposed on the board.

The luminous flux control member includes: a lens portion that diffuses the light emitted from the light emitting element; and three supporting, legs that protrude from the lens portion toward the board. Two supporting legs are fixed to the board. The one remaining supporting leg is formed shorter than the two supporting legs and disposed on the reflecting sheet. The one supporting leg cooperates with the board to sandwich the reflecting sheet, thereby alleviating the rising of the reflecting sheet.

CITATION LIST

Patent Literature

PLT1: JP-A-2011-3535
PLT2: JP-A-2011-86569

SUMMARY OF INVENTION

Technical Problem

However, in the patent document 1, the convex portion for alleviating the rising of the reflecting sheet is formed on the lens portion of the diffusing lens; accordingly, the distance from the light emitting diode board to the portion (convex portion) for alleviating the rising of the reflecting sheet becomes long. Because of this, the gap between the reflecting sheet and the portion (convex portion) for alleviating the rising of the reflecting sheet becomes large; accordingly, there is a problem that it is hard to sufficiently alleviate the rising of the reflecting sheet.

The light emitting device in the patent document 2 alleviates the rising of the reflecting sheet by means of the supporting leg of the luminous flux control member. Because of this, compared to the case (case of the patent document 1) where the rising of the reflecting sheet is alleviated by means of the lens portion, it is possible to shorten the distance from the board to the portion (one supporting leg) for alleviating the rising of the reflecting sheet. According to this, it is possible to make small the gap between the reflecting sheet and the portion (one supporting leg) for alleviating the rising of the reflecting sheet. Because of this, it is possible to more alleviate the reflecting sheet being raised from the board around the light emitting element. In this way, it is possible to more alleviate the light emitted from the light emitting element going under the reflecting sheet, and possible to more alleviate the brightness unevenness and light loss.

However, in the patent document 2, the one supporting leg is not fixed to the board; accordingly, there is a problem that the fixing of the diffusing lens becomes unstable. Besides, in the patent document 2, it is necessary to fix the diffusing lens after the reflecting sheet is disposed on the board. Because of this, it is necessary to fix the reflecting sheet to the board by means of an adhesive layer or the like until the diffusing lens is fixed; accordingly, the production process becomes onerous. Besides, for example, in a case where the mounting board is repaired, it is necessary to demount all the diffusing lenses before demounting the reflecting sheet; accordingly, it is hard to repair the mounting board and the like.

The present invention has been made to solve the above problems, and it is an object of the present invention to provide: an illumination device that is able to alleviate the rising of a reflecting sheet around a light emitting element while alleviating the fixing of a diffusing lens becoming unstable; and a display device that comprises the illumination device.

Solution to Problem

To achieve the object, an illumination device comprising: a light emitting element, a mounting board on which the light emitting element is mounted, a diffusing lens that is disposed to cover a light emitting side of the light emitting element and diffuse light emitted from the light emitting element, and a reflecting sheet that is provided with a through-hole, through which the diffusing lens is disposed, and disposed on the mounting board, wherein the diffusing lens includes: a lens portion that diffuses the light emitted from the light emitting element; and a fixing portion that protrudes from the lens portion to the mounting board side and is fixed to the mounting board, and the fixing portion is provided with an engaging portion that cooperates with the mounting board to sandwich the reflecting sheet.

In this illumination device, as described above, the diffusing lens includes the lens portion and the fixing portion, and the fixing portion is provided with the engaging portion that cooperates with the mounting board to sandwich the reflecting sheet. In other words, the diffusing lens alleviates the rising of the reflecting sheet. In this way, it is possible to alleviate the reflecting sheet being raised from the mounting board around the light emitting element. Besides, the raising of the reflecting sheet is alleviated by means of the engaging portion formed on the fixing portion of the diffusing lens; accordingly, compared to the case where the rising of the reflecting sheet is alleviated by means of the lens portion of the diffusing lens, it is possible to shorten the distance from the mounting board to the portion (engaging portion of the fixing portion) that alleviates the rising of the reflecting sheet. In this way, it is possible to make small the gap between the reflecting sheet and the portion (engaging portion of the fixing portion) that alleviates the rising of the reflecting sheet. Because of this, it is possible to sufficiently alleviate the reflecting sheet being raised from the mounting board around the light emitting element. As a result of this, it is possible to sufficiently alleviate the light emitted from the light emitting element going under the reflecting sheet; accordingly, it is possible to sufficiently alleviate the brightness unevenness and light loss.

Besides, as described above, the fixing portion fixed to the mounting board is provided with the engaging portion that alleviates the rising of the reflecting sheet, In this way, it is possible to alleviate the rising of the reflecting sheet while preventing the fixing of the diffusing lens from becoming unstable.

Besides, as described above, the reflecting sheet is provided with the through-hole through which the reflecting lens is disposed, and the fixing portion is provided with the engaging portion that cooperates with the mounting board to sandwich the reflecting sheet. In this way, after the diffusing lens is fixed to the mounting board, it is possible to dispose the reflecting sheet onto the mounting board and engage the reflecting sheet with the engaging portion. Because of this, it is unnecessary to fix the reflecting sheet to the mounting board by means of an adhesive layer or the like; accordingly, it is possible to alleviate the production process becoming onerous. Besides, for example, in a case of repairing the mounting board, it is possible to demount the reflecting sheet without demounting the diffusing lens; accordingly, it is possible to easily perform the repairing of the mounting board and the like.

In the above illumination device, preferably, the engaging portion is formed into a concave shape. According to such a structure, it is possible to alleviate the through-hole of the reflecting sheet becoming large; accordingly, it is possible to alleviate the light loss increasing. In the meantime, in the case where the diffusing lens is provided with a convex portion that protrudes in parallel with a surface of the mounting board as in the patent document 1, it is necessary to form the through-hole of the reflecting sheet large; accordingly, the light loss increases.

In the above illumination device, preferably, the engaging portion includes: a first engaging surface that engages with an inner surface of the through-hole of the reflecting sheet; and a second engaging surface that engages with a surface of the reflecting sheet opposite to a surface that faces the mounting board. According to such a structure, it is possible to limit movement of the reflecting sheet in a surface direction (direction parallel to the surface) and movement (rising of the reflecting sheet) of the reflecting sheet in a thickness direction by means of the engaging portion.

In the above illumination device, preferably, a plurality of the diffusing lenses are disposed, and each of the diffusing lenses is provided with the engaging portion at a portion on the same side. According to such a structure, it is possible to easily engage the reflecting sheet with each engaging portion by disposing the reflecting sheet onto the mounting board and sliding the reflecting sheet in a predetermined direction (opposite to the side where the engaging portion is formed).

In this case, preferably, the diffusing lens includes a plurality of the fixing portions, and the engaging portion is formed on all the fixing portions. According to such a structure, when fixing the diffusing lens onto the mounting board, it becomes unnecessary to align the directions (mounting directions) of the diffusing lenses; accordingly, it is possible to improve the mounting work of the diffusing lenses.

A display device according to this invention comprises: the illumination device having the above structure, and a display panel that uses light from the illumination device to perform display. According to such a structure, it is possible to obtain a display device that is able to alleviate the rising of the reflecting sheet around the light emitting element while alleviating the fixing of the diffusing lens becoming unstable.

Advantageous Effects of Invention

As described above, according to the present invention, it is possible to obtain: an illumination device that is able to alleviate the rising of a reflecting sheet around a light emitting element while alleviating the fixing of a diffusing lens becoming unstable; and a display device that includes the illumination device.

DESCRIPTION OF EMBODIMENTS

Hereinafter, embodiments of the present invention are described with reference to the drawings. In the meantime, there is a case where hatching is not applied even to a cross-sectional view for the sake of easy understanding.
(First Embodiment)

Figure 1:
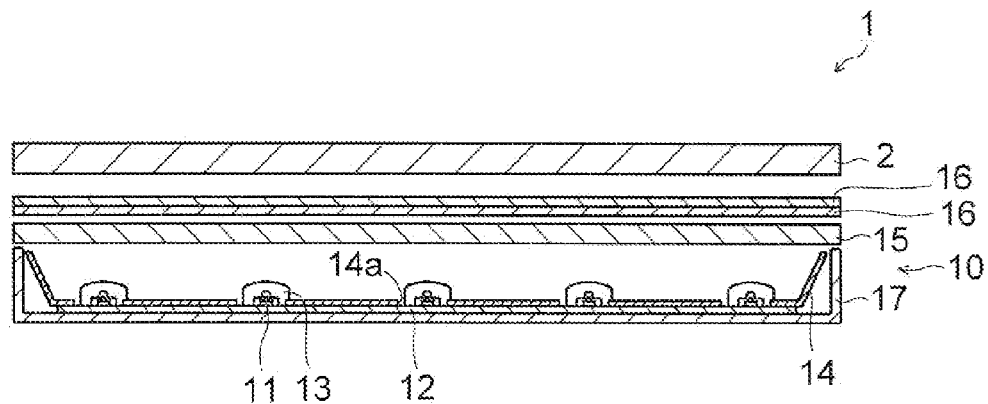
FIG. 1 is a cross-sectional view showing schematically a structure of a display device that comprises an illumination device according to a first embodiment of the present invention.

With reference to FIG. 1 to FIG. 5, a structure of a display device 1, which comprises an illumination device 10 according to an first embodiment of the present invention, is described. The display device 1 according to the first embodiment of the present invention is used for a television receiver and the like, for example. Besides, as shown in FIG. 1, the display device 1 comprises a display panel 2, and the illumination device 10 that is disposed near a rear side of the display panel 2 and illuminates the display panel 2.

The display panel 2 includes a liquid crystal display panel, and has two glass boards that sandwich a liquid crystal layer which is not shown. Besides, the display panel 2 uses light from the illumination device 10 to display an image.

The illumination device 10 is a backlight device of direct type. Besides, the illumination device 10 includes: a plurality of light emitting elements 11; a mounting board 12 on which the plurality of light emitting elements 11 are mounted; a plurality of diffusing lenses 13 that are disposed to cover a light emitting side (side facing the display panel 2) of the light emitting element 11; a reflecting sheet 14 disposed on the mounting board 12; a diffusing plate 15 that is disposed to cover the light emitting element 11 and the diffusing lens 13; a plurality of optical sheets 16 disposed on a front surface (surface facing the display panel 2) of the diffusing plate 15; and a chassis 17 that houses the light emitting elements 11 and the mounting board 12.

The plurality of light emitting elements 11 are disposed into a matrix shape. The light emitting element 11 is composed of an LED, for example, and emits white light.

Figure 2:
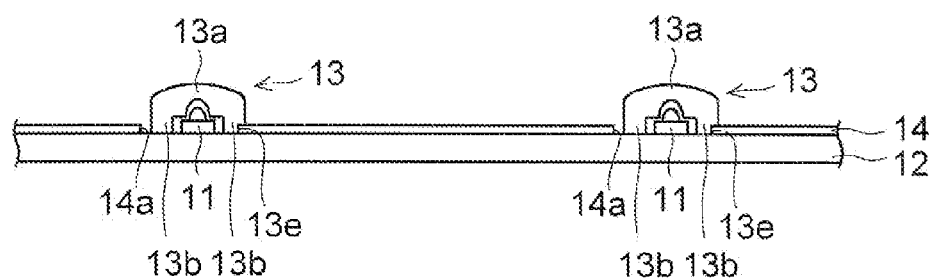
FIG. 2 is a cross-sectional view showing a structure around a diffusing lens of the illumination device shown in FIG. 1 according to the first embodiment of the present invention.

As shown in FIG. 2, the reflecting sheet 14 is provided with a through-hole 14a through which the diffusing lens 13 is disposed. The reflecting sheet 14 has a function to reflect light emitted from the light emitting element to the display panel 2 side.

The diffusing lens 13 is formed of a material (e.g., resin or glass) that transmits light and has a function to diffuse and transmit the light from the light emitting element 11 to the display panel 2 side. The diffusing lens 13 is disposed to cover the light emitting element 11 and formed one for one light emitting element 11. The diffusing lens 13 is fixed to a predetermined position of the mounting board 12.

Figure 3:
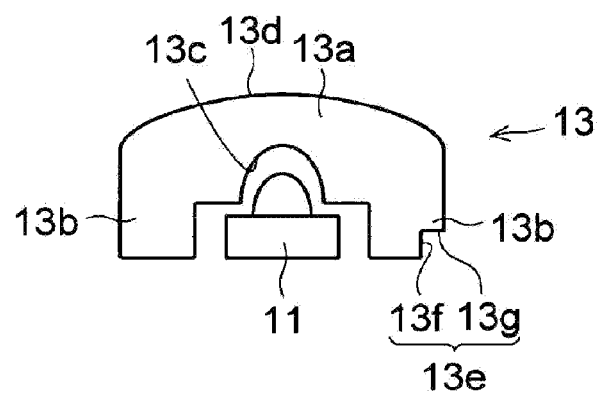
FIG. 3 is an enlarged cross-sectional view showing structures of a diffusing lens and a light emitting element of the diffusing device shown in FIG. 1 according to the first embodiment of the present invention.

As shown in FIG. 3, the diffusing lens 13 includes: a lens portion 13a that diffuses the light emitted from the light emitting element 11; and a plurality of (e.g., three) fixing portions 13b that protrude from the lens portion 13a toward the mounting board 12. The lens portion 13a includes a concave-shaped light entering surface 13c from which the light emitted from the light emitting element 11 enters; and a light output surface 13d that outputs the light. In the meantime, the drawing illustrates an example in which the light output surface 13d is formed into substantially a hemisphere-shaped surface; however, the light output surface 13d may be formed into another shape that is a combination of for example, a convex shape and a concave shape.

The fixing portion 13b is formed into, for example, a cylindrical shape and formed not to extend beyond a contour of the lens portion 13a when viewed from top. The fixing portions 13b are formed on the diffusing lens 13 by three, for example, and disposed at an angle interval of 120° around a center of the lens portion 13a.

The fixing portion 13b is fixed to the mounting board 12 by means of an adhesive layer (not shown), for example. In the present embodiment, as to each diffusing lens 13, one of the plurality of (e.g., three) fixing portions 13b is provided with one concave-shaped engaging portion 13e. The engaging portion 13e includes: an engaging surface 13f (first engaging surface) that engages with an inner surface of the through-hole 14a of the reflecting sheet 14; and an engaging surface 13g (second engaging surface) that engages with a front surface (surface opposite to a surface that faces the mounting board 12) of the reflecting sheet 14. In this way, the engaging portion 13e cooperates with the mounting board 12 to sandwich the reflecting sheet 14, and engages with the through-hole 14a of the reflecting sheet 14.

Figure 4:
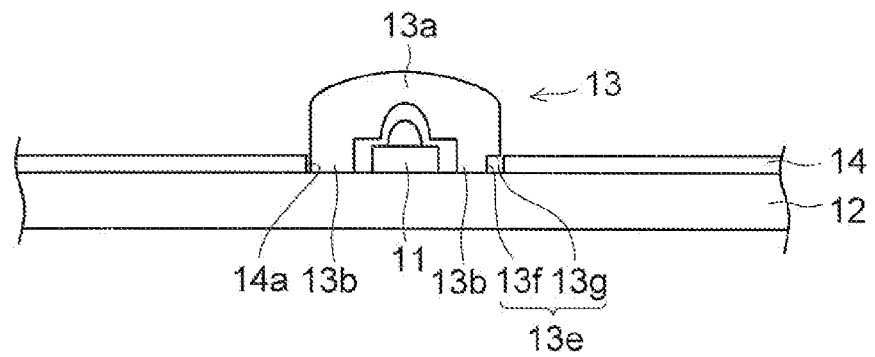
FIG. 4 is a cross-sectional view showing a state in which a reflecting sheet of the illumination device shown in FIG. 1 according to the first embodiment of the present invention is disposed on a mounting board.
Figure 5:
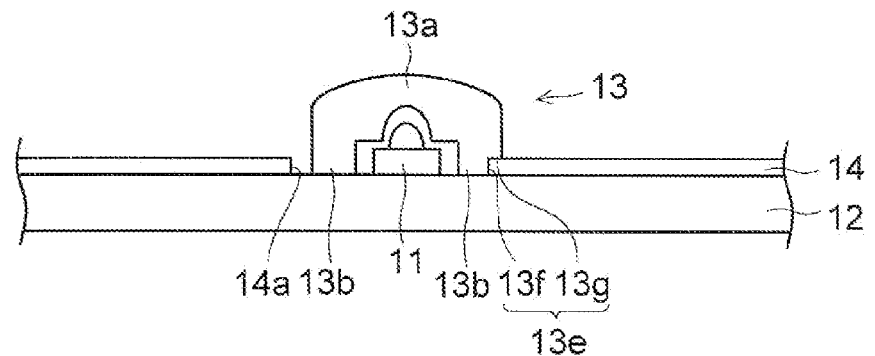
FIG. 5 is a cross-sectional view showing a state in which a reflecting sheet of the illumination device shown in FIG. 1 according to the first embodiment of the present invention is slid.

Besides, as shown in FIG. 2, in a state in which the plurality of diffusing lenses 13 are fixed to the mounting board 12, each of the engaging portions 13e is formed at a portion (right portion in the drawing) on the same side of the diffusing lens 13. In an assembly process of the illumination device 10, after the light emitting element 11 is mounted onto the mounting board 12, the diffusing lens 13 is fixed to the mounting board 12. At this time, the directions (mounting directions) of the diffusing lenses 13 are aligned such that each engaging portion 13e faces the same direction (right side in the drawing). And, as shown in FIG. 4, the reflecting sheet 14 is disposed onto the mounting board 12. Thereafter, the reflecting sheet 14 is slid in a direction (left side in the drawing) opposite to the same side, whereby as shown in FIG. 5, the through-hole 14a of the reflecting sheet 14 engages with the engaging portion 13e of the diffusing lens 13. In this way, movement in the direction opposite (left side in the drawing) to the same side of the reflecting sheet 14 and movement (rising of the reflecting sheet 14) of the reflecting sheet 14 toward the display panel 2 are limited.

As shown in FIG. 1, the diffusing plate 15 includes a resin plate-shaped member, and closes an opening of the chassis 17 that faces the display panel Besides, the diffusing plate 15 has a function to diffuse the light from the diffusing lens 13 and transmit the light to the display panel 12. A rear surface of the diffusing plate 15 may be supported by a plurality of supporting pins (not shown). The supporting pin may be fixed to the chassis 17, for example. The reflecting sheet 14 may be provided with an insertion hole (not shown) for inserting the supporting pin.

The plurality of optical sheets 16 include a resin sheet-shaped member thinner than the diffusing plate 15 and are disposed on the side of the diffusing plate 15 that faces the display panel 2. The optical sheets 16 perform diffusion and collection of the light transmitted through the diffusing plate 15. In the meantime, the kind of the optical sheets 16 utilized is changeable in accordance with uses.

In the present embodiment, as described above, the diffusing plate 13 is provided with the engaging portion 13e that cooperates with the mounting board 12 to sandwich the reflecting sheet 14. In other words, the rising of the reflecting sheet 14 is alleviated by means of the engaging portion 13e formed on the diffusing lens 13; accordingly, it is possible to alleviate the reflecting sheet 14 being raised from the mounting board 12 around the light emitting element 11. Besides, the rising of the reflecting sheet 14 is alleviated by means of the engaging portion 13e formed on the fixing portion 13b of the diffusing lens 13; accordingly, compared to the case where the rising of the reflecting sheet 14 is alleviated by means of the lens portion 13a of the diffusing lens 13, it is possible to shorten the distance from the mounting board 12 to the portion (engaging surface 13g of the fixing portion 13b) that alleviates the rising of the reflecting sheet 14. In this way, it is possible to sufficiently make small the gap between the reflecting sheet 14 and the portion (engaging surface 13g of the fixing portion 13b) that alleviates the rising of the reflecting sheet 14. Because of this, it is possible to sufficiently alleviate the reflecting sheet 14 being raised from the mounting board 12 around the light emitting element 11. As a result of this, it is possible to sufficiently alleviate the light emitted from the light emitting element 11 going under the reflecting sheet 14; accordingly, it is possible to sufficiently alleviate the brightness unevenness and light loss.

Besides, as described above, by forming the engaging portion 13e, which alleviates the rising of the reflecting sheet 14, on the fixing portion 13b fixed to the mounting board 12, it is possible to alleviate the rising of the reflecting sheet 14 while preventing the fixing of the diffusing lens 13 from becoming unstable.

Besides, as described above, the reflecting sheet 14 is provided with the through-hole 14a through which the diffusing lens 13 is disposed, and the fixing portion 13b is provided with the engaging portion 13e that cooperates with the mounting board 12 to sandwich the reflecting sheet 14. In this way, after the diffusing lens 13 is fixed to the mounting board 12, it is possible to dispose the reflecting sheet 14 onto the mounting board 12 and engage the reflecting sheet 14 with the engaging portion 13e. Because of this, it is unnecessary to fix the reflecting sheet 14 to the mounting board 12 by means of an adhesive layer and the like; accordingly, it is possible to alleviate the production process becoming onerous. Besides, for example, in a case of repairing the mounting board 12, it is possible to demount the reflecting sheet 14 without demounting the diffusing lens 13; accordingly, it is possible to easily perform the repairing of the mounting board 12 and the like.

Besides, as described above, the engaging portion 13e is formed into the concave shape. In this way, it is possible to alleviate the through-hole 14a of the reflecting sheet 14 becoming huge; accordingly, it is possible to alleviate the light loss increasing. In the meantime, as in the patent document 1, in a case where the diffusing lens is provided with a convex portion that protrudes in parallel with a surface of the mounting board, it is necessary to form the through-hole of the reflecting sheet large; accordingly, the light loss increases.

Besides, as described above, the engaging portion 13e includes: the engaging surface 13f that engages with the inner surface of the through-hole 14a of the reflecting sheet 14 and the engaging surface 13g that engages with the front surface (surface opposite to the surface that faces the mounting board 12). In this way, it is possible to limit, by means of the engaging portion 13e, movement of the reflecting sheet 14 in a surface direction and (direction parallel to the surface) and movement (rising of the reflecting sheet 14) of the reflecting sheet 14 in a thickness direction.

Besides, as described above, the plurality of diffusing lenses 13 are formed, and each of them is provided with the engaging portion 13e at the portion on the same side. In this way, by disposing the reflecting sheet 14 onto the mounting board 12 and sliding the reflecting sheet 14 in the direction (direction opposite to the side where the engaging portion 13e is formed) opposite to the same side, it is possible to easily engage the reflecting sheet 14 with each engaging portion 13e.

(Second Embodiment)

Figure 6:
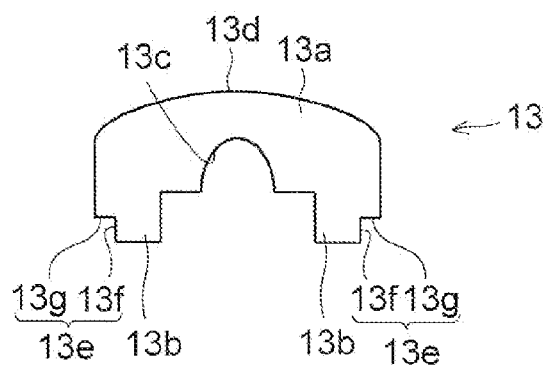
FIG. 6 is an enlarged cross-sectional view showing a structure of a diffusing lens according to a second embodiment of the present invention.
Figure 7:
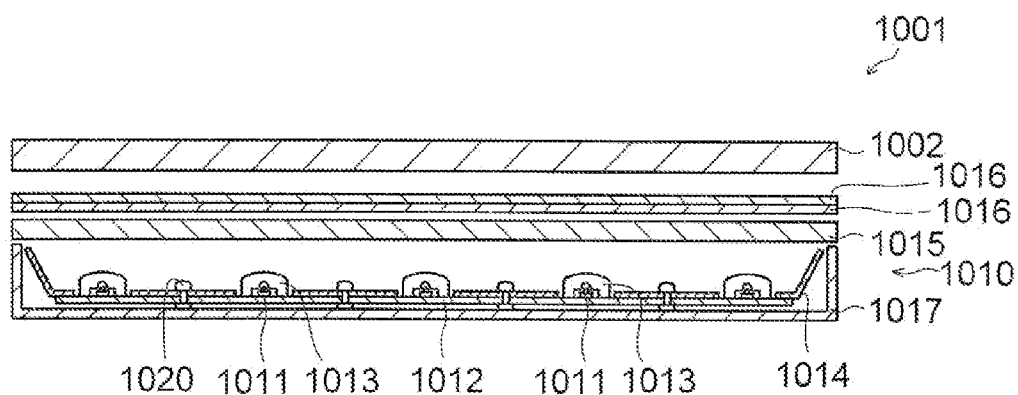
FIG. 7 is a cross-sectional view showing schematically a structural example of a conventional display device that comprises a backlight device of direct type which includes a plurality of LEDs and a reflecting sheet.
Figure 8:
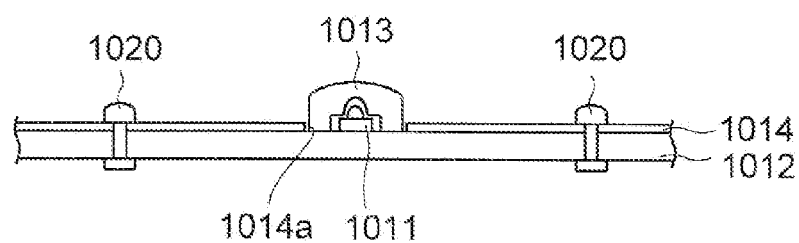
FIG. 8 is a cross-sectional view showing a structure around a diffusing lens of the conventional display device shown in FIG. 7.
Figure 9:
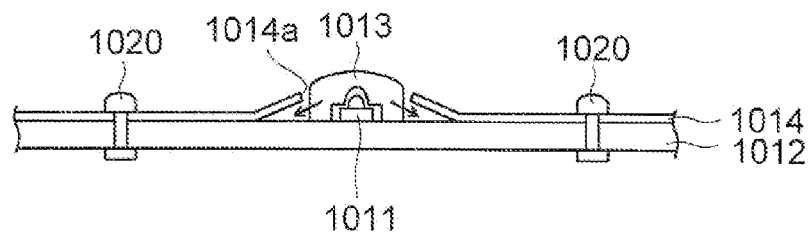
FIG. 9 is a cross-sectional view showing a structure around a diffusing lens of the conventional display device shown in FIG. 7.

As shown in FIG. 6, in a second embodiment of the present invention, the diffusing lens 13 includes a plurality of (e.g., three) fixing portions 13b, and the engaging portion 13e is formed on the outer portions (opposite portion with respect to the center of the lens portion 13a) of all the fixing portions 13b.

The other structures of the second embodiment are the same as the above first embodiment.

In the present embodiment, as described above, the engaging portion 13e is formed on all the fixing portions 13b. In this way, when fixing the diffusing lenses 13 to the mounting, board 12, it becomes unnecessary to align the directions (mounting directions) of the diffusing lenses 13; accordingly, it is possible to improve the mounting work of the diffusing lenses 13.

The other effects of the second embodiment are the same as the above first embodiment.

In the meantime, it should he considered that the embodiments disclosed this time are examples in all respects and are not limiting. The scope of the present invention is not indicated by the above description of the embodiments but by the claims, and all modifications within the scope of the claims and the meaning equivalent to the claims are covered.

For example, in the above embodiments, the example, in which the display panel is applied to the liquid crystal display panel, is described; however, the present invention is not limited to this, but may be applied to a display panel other than the liquid crystal display panel.

Besides, in the above embodiments, the backlight device, which illuminates the display panel as an example of the illumination device, is described; however, the present invention is not limited to this, but is also applicable to an illumination device that illuminates a member to be illuminated other than the display panel. For example, the present invention is also applicable to a ceiling illumination device that comprises a panel (member to be illuminated), an illumination device that illuminates a display board (member to be illuminated) of a sign from a rear side and the like.

Besides, in the above embodiments, the example, in which the light emitting element is structured to emit the while light, is described; however, the present invention is not limited to this, but the light emitting element may be structured to emit light other than the white light.

Besides, in the above embodiments, the example, in which the engaging portion is formed into the concave shape, is described; however, the present invention is not limited to this, but the engaging portion may be formed into a convex shape.

REFERENCE SIGNS LIST 1 display device
2 display panel
10 illumination device
11 light emitting element
12 mounting hoard
13 diffusing lens
13a lens portion
13b fixing portion
13e engaging portion
13f engaging surface (first engaging surface)
13g engaging surface (second engaging surface)
14 reflecting sheet
14a through-hole

The invention claimed is:

1. An illumination device comprising:
a light emitting element,
a mounting board on which the light emitting element is mounted,
a diffusing lens that is disposed to cover a light emitting side of the light emitting element and to diffuse light emitted from the light emitting element, and
a reflecting sheet that is provided with a through-hole, through which an entirety of the diffusing lens is able to pass, and disposed on the mounting board, wherein
the diffusing lens includes: a lens portion that diffuses the light emitted from the light emitting element; and a fixing portion that protrudes from the lens portion to the mounting board side and is fixed to the mounting board,
wherein the fixing portion is formed to not extend beyond the contour of the lens portion when viewed from the top; and
the fixing portion is provided with a concave-shaped engaging portion that cooperates with the mounting board to sandwich the reflecting sheet.

2. The illumination device according to claim 1, wherein the fixing portion extends from a surface of the lens portion facing the mounting board.

3. The illumination device according to claim 1, wherein the engaging portion includes: a first engaging surface that engages an inner surface of the through-hole of the reflecting sheet; and a second engaging surface that engages a surface of the reflecting sheet opposite to a surface that faces the mounting board.

4. The illumination device according to claim 1, wherein a plurality of the diffusing lenses are disposed on said mounting board, and each of the diffusing lenses is provided with an engaging portion at a portion of each respective lens having a common orientation.

5. The illumination device according to claim 4, wherein each diffusing lens includes a plurality of fixing portions, wherein an engaging portion is formed on each of the fixing portions.

6. A display device comprising:
an illumination device according to claim 1, and
a display panel that uses light from the illumination device to perform display.

7. The illumination device according to claim 2, wherein the engaging portion includes: a first engaging surface that engages an inner surface of the through-hole of the reflecting sheet; and a second engaging surface that engages a surface of the reflecting sheet opposite to a surface that faces the mounting board.

8. The illumination device according to claim 2, wherein a plurality of the diffusing lenses are disposed on said mounting board, and
each of the diffusing lenses is provided with an engaging portion at a portion of each respective lens having a common orientation.

9. The illumination device according to claim 3, wherein a plurality of the diffusing lenses are disposed on said mounting board, and
each of the diffusing lenses is provided with an engaging portion at a portion of each respective lens having a common orientation.

10. A display device comprising:
an illumination device according to claim 2, and
a display panel that uses light from the illumination device to perform display.

11. A display device comprising:
an illumination device according to claim 3, and
a display panel that uses light from the illumination device to perform display.

12. A display device comprising:
an illumination device according to claim 4, and
a display panel that uses light from the illumination device to perform display.

13. A display device comprising:
an illumination device according to claim 5, and
a display panel that uses light from the illumination device to perform display.

14. The illumination device according to claim 1, said diffusing lens having a plurality of fixing portions, wherein an engaging portion is formed on each of the fixing portions.

* * * * *